United States Patent
Nishikawa

(10) Patent No.: US 6,343,902 B1
(45) Date of Patent: Feb. 5, 2002

(54) REAMER AND METHOD OF USING THE SAME

(75) Inventor: Tsuneo Nishikawa, Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/509,823

(22) PCT Filed: Oct. 27, 1998

(86) PCT No.: PCT/JP98/04861

§ 371 Date: Apr. 19, 2000

§ 102(e) Date: Apr. 19, 2000

(87) PCT Pub. No.: WO99/21673

PCT Pub. Date: May 6, 1999

(30) Foreign Application Priority Data

Oct. 28, 1997 (JP) ............................................. 9-295178

(51) Int. Cl.$^7$ ............................. B23C 5/26; B23B 41/00
(52) U.S. Cl. ..................... 409/132; 407/31; 408/224; 409/66
(58) Field of Search ................................ 409/132, 131, 409/66, 71, 73, 74; 408/226, 224, 223, 227; 401/31, 52

(56) References Cited

U.S. PATENT DOCUMENTS

| | | | | |
|---|---|---|---|---|
| 1,291,467 A | * | 1/1919 | Forester | 408/224 |
| 1,324,459 A | * | 12/1919 | Maier | 408/224 |
| 1,725,299 A | * | 8/1929 | Pickin | 408/224 X |
| 2,212,753 A | * | 8/1940 | Smila et al. | 408/224 |
| 2,657,066 A | * | 10/1953 | Boyd, Jr. | 408/224 |
| 3,981,210 A | * | 9/1976 | Janiszewski | 408/241 B |
| 4,242,020 A | * | 12/1980 | Schmid | 409/234 |
| 4,497,383 A | * | 2/1985 | Ostertag | 408/224 |
| 5,080,538 A | * | 1/1992 | Schmitt | 409/66 |
| 5,201,353 A | * | 4/1993 | Weill | 407/31 X |
| 5,413,438 A | * | 5/1995 | Turchan | 409/66 |
| 5,865,573 A | * | 2/1999 | Kress | 408/708 |

FOREIGN PATENT DOCUMENTS

| | | | | |
|---|---|---|---|---|
| FR | 1281477 | * | 12/1961 | 407/31 |
| GB | 978467 | * | 11/1961 | 407/31 |
| JP | 54-1476 | * | 1/1979 | 407/31 |
| JP | 63-10003 | | 1/1988 | |
| JP | 1-60807 | | 4/1989 | |
| JP | 7-148605 | | 6/1995 | |
| JP | 8-39310 | | 2/1996 | |
| NL | 7414313 | * | 2/1975 | 407/31 |
| SU | 874278 | * | 10/1981 | 407/31 |

* cited by examiner

Primary Examiner—William Briggs
(74) Attorney, Agent, or Firm—Arent Fox Kintner Plotkin & Kahn, PLLC

(57) ABSTRACT

A reamer T including three-stage chip groups 6, each group having five chips 6 disposed circumferentially on a circle of a diameter smaller than an inside diameter of a hole H in a work W, axially at a given pitch P. When the axis Lt of the rotated reamer T is moved circumferentially on a circle about the axis Lw of the hole H after the reamer T is inserted into the hole H in the work W, the three-stage chip groups 6 simultaneously cut an inner peripheral surface of the hole H. When the reamer T is moved in the direction of pulling from the hole H by one pitch P in this state, the three-stage chip groups 6 simultaneously cut the inner peripheral surface of the hole H in the work W respectively by one pitch. Therefore, a boring work for providing the hole H having a depth D=3P in the work W can be completed in a short time.

8 Claims, 6 Drawing Sheets

REAMER AND METHOD OF USING THE SAME

FIELD OF THE INVENTION

The present invention relates to a reamer for boring an inner peripheral surface of a hole provided in a work, and to a method of using the reamer.

PRIOR ART

When, for example, an inner peripheral surface of a cylinder bore defined in a cylinder block of an engine is subjected to boring, a reamer 01 as shown in FIG. 6 is used in the prior art. The reamer 01 has a head 03 at a tip end of a shank 02, and five cutting tools 04 are supported circumferentially at equal distances on the head. Thus, the inner peripheral surface of the cylinder bore B in the cylinder block W is cut by the cutting tools 04 by moving the reamer 01 along its axis Lt, while rotating the reamer 01 about its axis Lt.

The above prior art reamer suffers from a problem that since it is necessary to move the reamer 01 axially by a distance D in order to cut the inner peripheral surface of the cylinder bore B having a depth D, it is difficult to reduce the time of working.

The present invention has been accomplished with the above circumstances in view, and it is an object of the present invention to reduce the time of working when boring an inner peripheral surface of a hole in a work.

DISCLOSURE OF THE INVENTION

To achieve the above object, according to the present invention, there is proposed a reamer for boring an inner peripheral surface of a hole provided in a work, comprising a plurality of chip groups each having a plurality of chips disposed circumferentially on a circle having a diameter smaller than an inside diameter of the hole in the work, the chip groups being disposed axially at a given pitch around outer peripheral surfaces of substantially columnar heads wherein each circle passing through tip ends of cutting edges of each of the chip groups has a diameter set equal to each other.

With the above arrangement, the plurality of chip groups which are disposed axially at the given pitch simultaneously cut the inner peripheral surface of the hole in the work. Therefore, the inner peripheral surface of the hole in the work can be cut over the entire length of the hole only by moving the reamer axially by the distance corresponding to one pitch, thereby enabling the time required for the boring work to be reduced. In addition, the diameter of the hole made by boring can be changed by changing the diameter of a circle of eccentric movement of the axis of the reamer, and hence, the general-purpose utility of the reamer can be enhanced.

According to the present invention, there is proposed a process for use of a reamer of the above-described type, comprising a step of inserting at least two chip groups into a hole in a work with an axis of the reamer aligned with an axis of the hole in the work, a step of moving the reamer in the direction of pulling from the hole in the work by the distance equal to the pitch, while moving the axis of the rotated reamer circumferentially on a circle about the axis of the hole, and a step of pulling the reamer fully out of the hole in the work with the axis of the reamer aligned with the axis of the hole in the work.

With the above arrangement, when the axis of the reamer is moved circumferentially on the circle about the axis of the hole while rotating the reamer, after the reamer is inserted into the hole in the work, the plurality of chip groups simultaneously cut the inner peripheral surface of the hole. When the reamer is moved in the direction of pulling from the hole by the distance equal to one pitch in this state, the plurality of chip groups simultaneously cut the inner peripheral surface of the hole in the work by the distance equal to one pitch, and hence, the boring work can be completed in a short time. In addition, the diameter of the hole made by boring can be changed by changing the diameter of the circle of eccentric movement of the axis of the reamer and hence, the general-purpose properties can be enhanced.

BEST MODE FOR CARRYING OUT THE INVENTION

The mode for carrying out the present invention will now be described by way of an embodiment of the present invention with reference to the accompanying drawings.

FIGS. 1 to 5 show an embodiment of the present invention.

Figure 1:
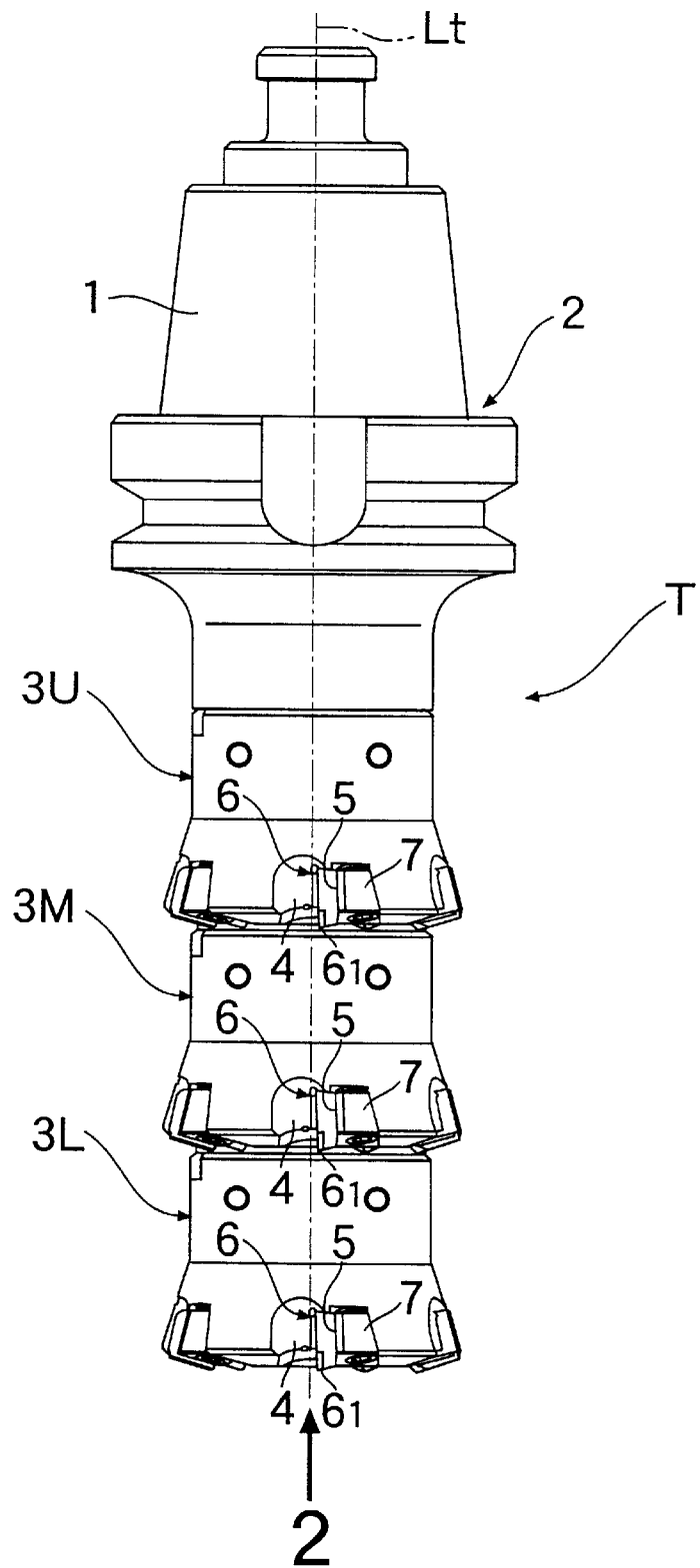
FIG. 1 is a side view of the entire arrangement of a reamer.
Figure 2:
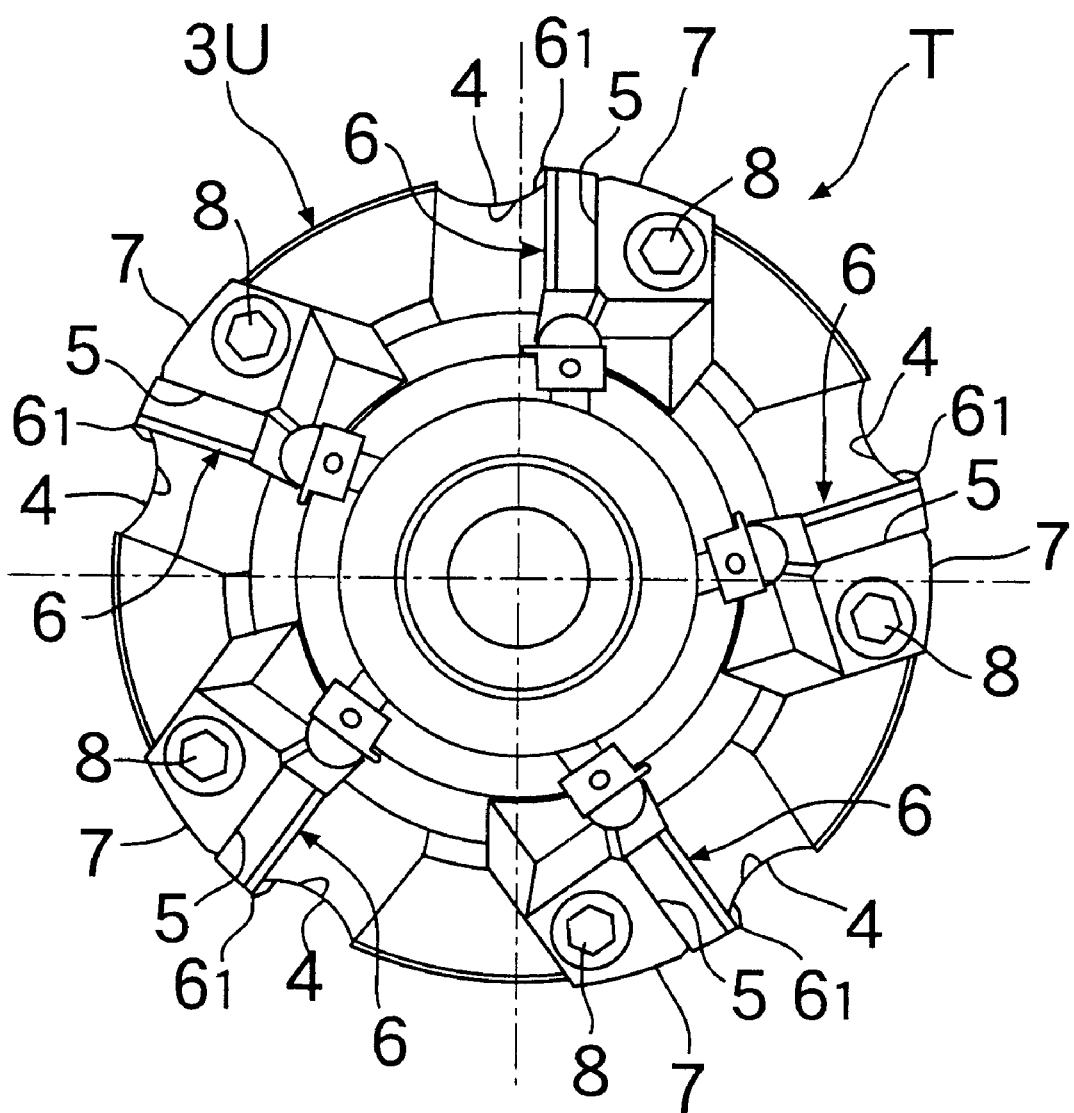
FIG. 2 is a view taken in the direction of an arrow 2 in FIG. 1.

As shown in FIGS. 1 and 2, a reamer T is comprised of a shank 2 integrally provided with a clamp portion 1 which is clamped by a chuck of a machine tool, and three heads 3L, 3M and 3U which are detachably supported on the shank 2 on an axis Lt of the shank 2. The heads 3L, 3M and 3U have the same structure, and the structure of the lowermost head 3L (at a tip end of the reamer T) as a representative of the heads will be described below.

Five cutting pockets 4 are provided in a recessed manner at distances of 72° around an outer periphery of a lower end of the head 3L. Chips 6 are detachably fitted into clamp grooves 5, respectively, which are provided in a recessed manner at locations retarded from the cutting pockets 4 as viewed in the rotational direction. The chip 6 fitted in each of the clamp grooves 5 is in abutment against a clamp claw 7 which forms one of sidewalls of such clamp groove 5, so that the clamp claw 7 is brought into pressure contact with the chip 6 by tightening a clamp bolt 8, thereby fixing the chip 6 in the clamp groove 5.

A circle passing through tip ends of cutting edges $6_1$ of the five chips 6 forming a chip group is formed with a diameter d slightly smaller than a diameter $d_1$ of a prepared hole H' (see FIG. 3) in a cylinder bore B in a cylinder block W. A pitch P from the cutting edges $6_1$ of the chip group 6 in the lowermost head 3L to the cutting edges $6_1$ of the chip group 6 in the middle head 3M is set equal to a pitch P from the cutting edges $6_1$ of the chip group 6 in the middle head 3M to the cutting edges $6_1$ of the chip group 6 in the uppermost head 3U, and is set at a value which is one third of a depth D of the cylinder bore B in the cylinder block W (P=D/3).

The operation of the embodiment of the present invention having the above-described arrangement will be described below.

Figure 3:
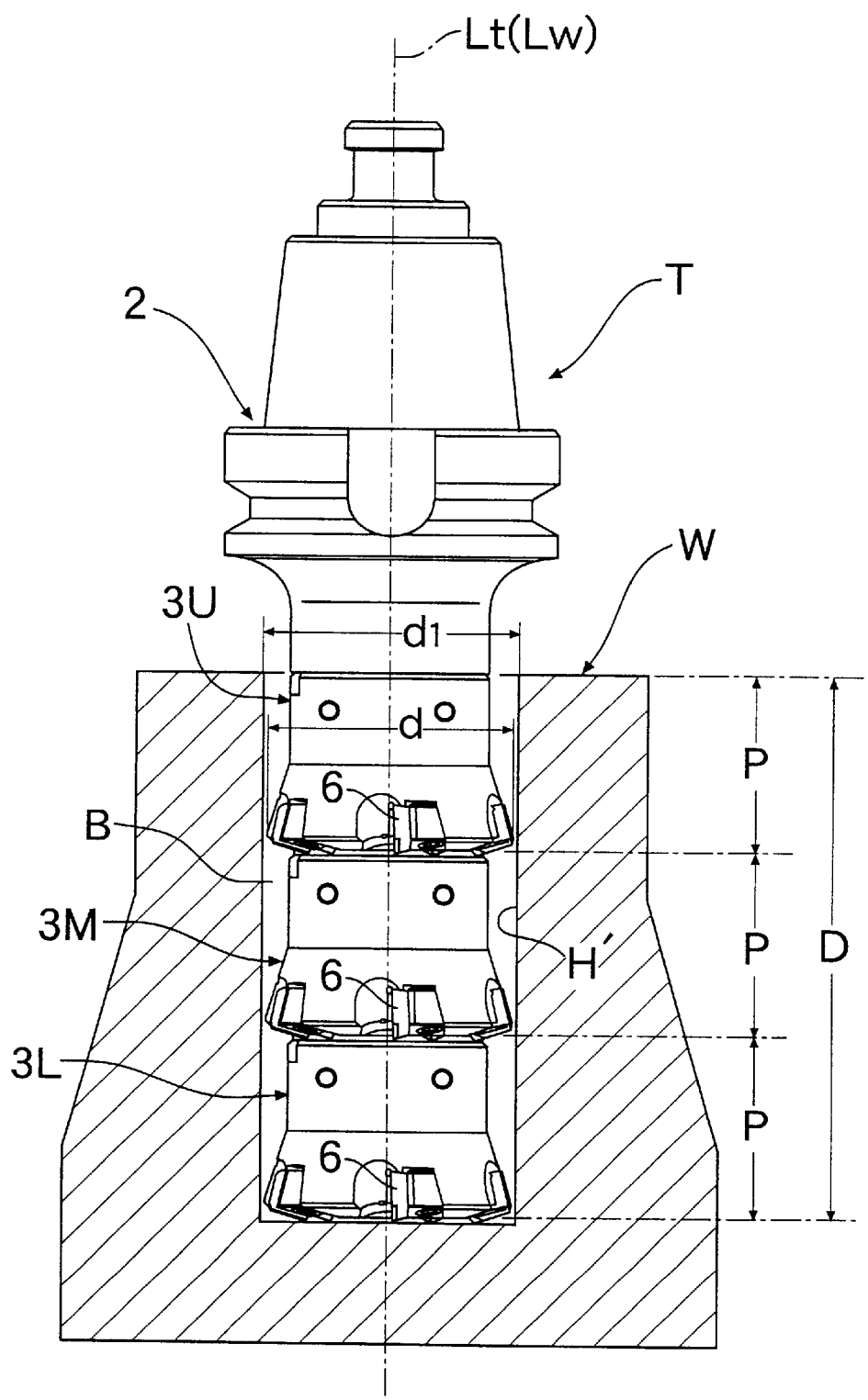
FIG. 3 is a view showing a state before starting a boring work.

First, in a state in which the axis Lt of the reamer T has been aligned with an axis Lw of the prepared hole H' in the cylinder bore B, as shown in FIG. 3, the reamer T is inserted into the cylinder bore B, whereby the group of chips 6 of the lowermost head 3L are put into abutment against a bottom surface of the cylinder bore B. At this time, the chip groups 6 of the middle head 3M and the chip group 6 of the uppermost head 3U are opposed to an inner peripheral surface of the prepared hole H' in the cylinder bore B.

Figure 4:
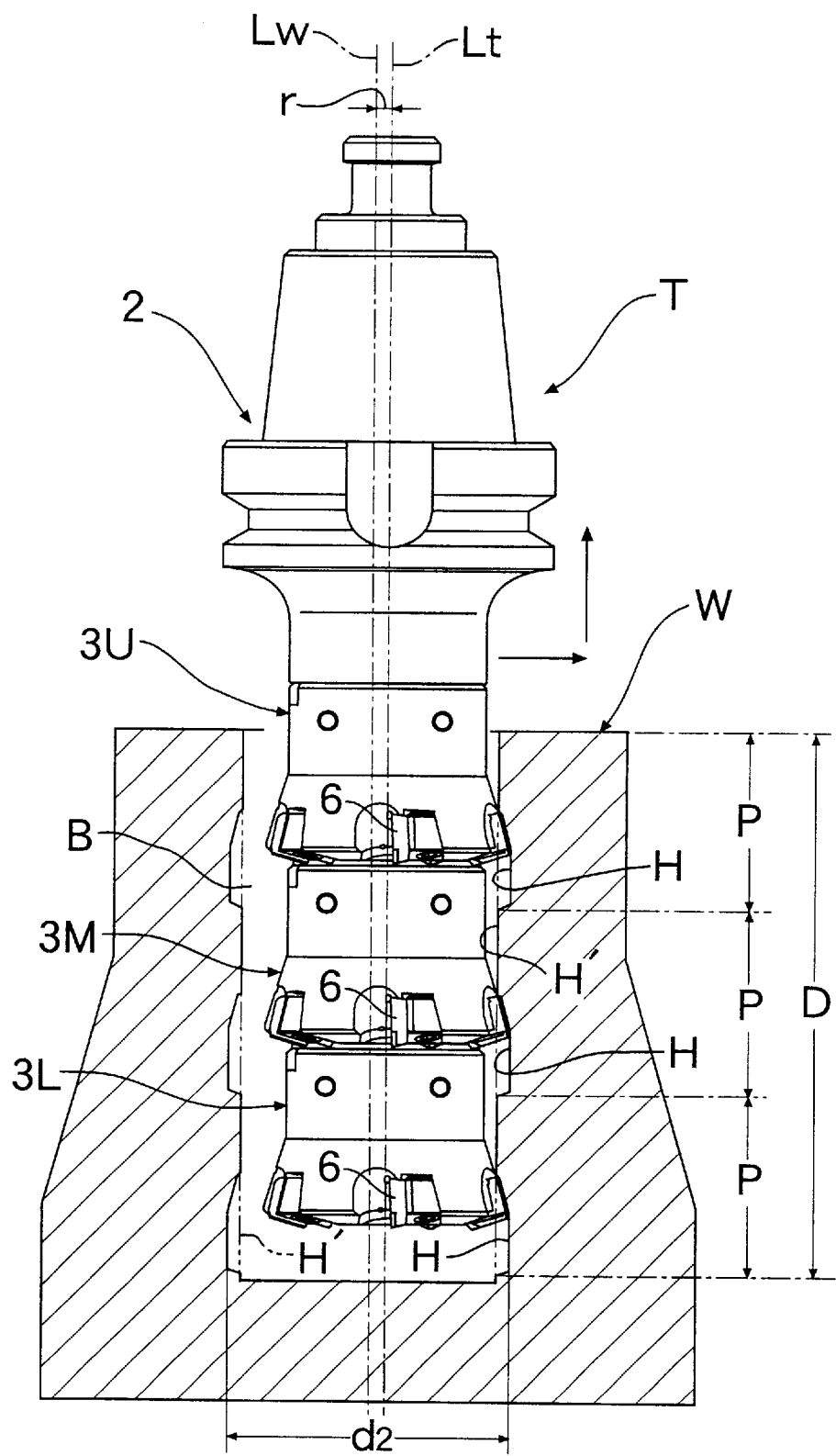
FIG. 4 is a view showing a state during the boring work.

Subsequently, as shown in FIG. 4, the axis Lt of the rotated reamer T is moved by a distance r in the radial direction relative to the axis Lw of the prepared hole H' in the cylinder bore B. Then, the reamer T is moved along the axis Lw in the direction of pulling from the prepared hole H', while further moving the axis Lt of the reamer T circumferentially of a circle having a radius r about the axis Lw of the prepared hole H' in the cylinder bore B. As a result, a hole H having a diameter $d_2$ is made by boring in the cylinder bore B by the chip group 6 of the three-stage heads 3L, 3M and 3U ($d_2=d_1+2r$). When the reamer T is moved by the distance equal to the pitch P along the axis Lw, the boring over a distance P is achieved by the chip group 6 of each stage of the heads 3L, 3M and 3U. Thus, it is possible to complete the boring work for the entire length of the hole H having a depth D=3P in the cylinder bore B only by moving the reamer T by the distance P, thereby enabling the time of cutting to be reduced to a value which is one third of the time in the prior art.

Figure 5:
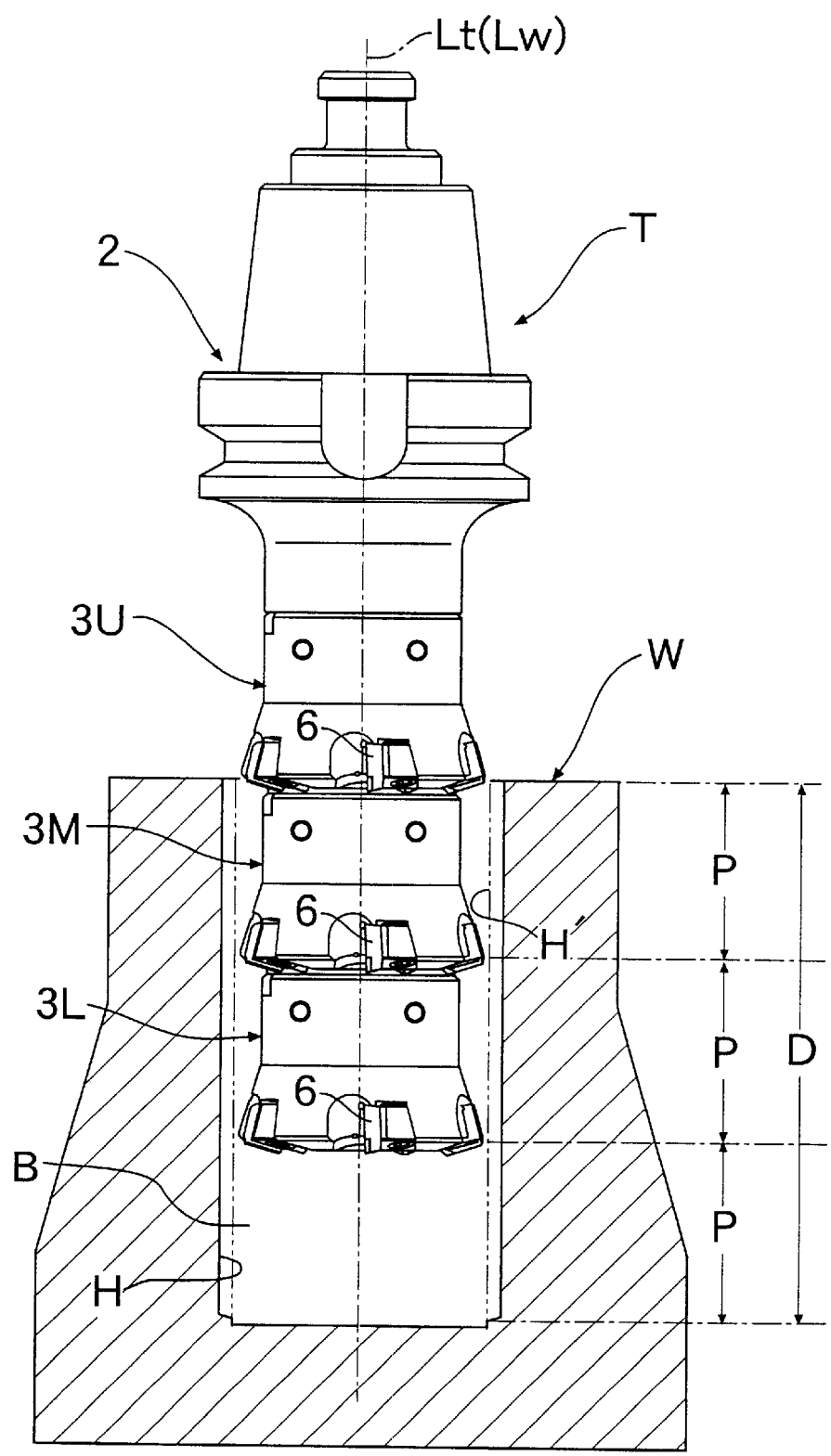
FIG. 5 is a view showing a state after completion of the boring work.
Figure 6:
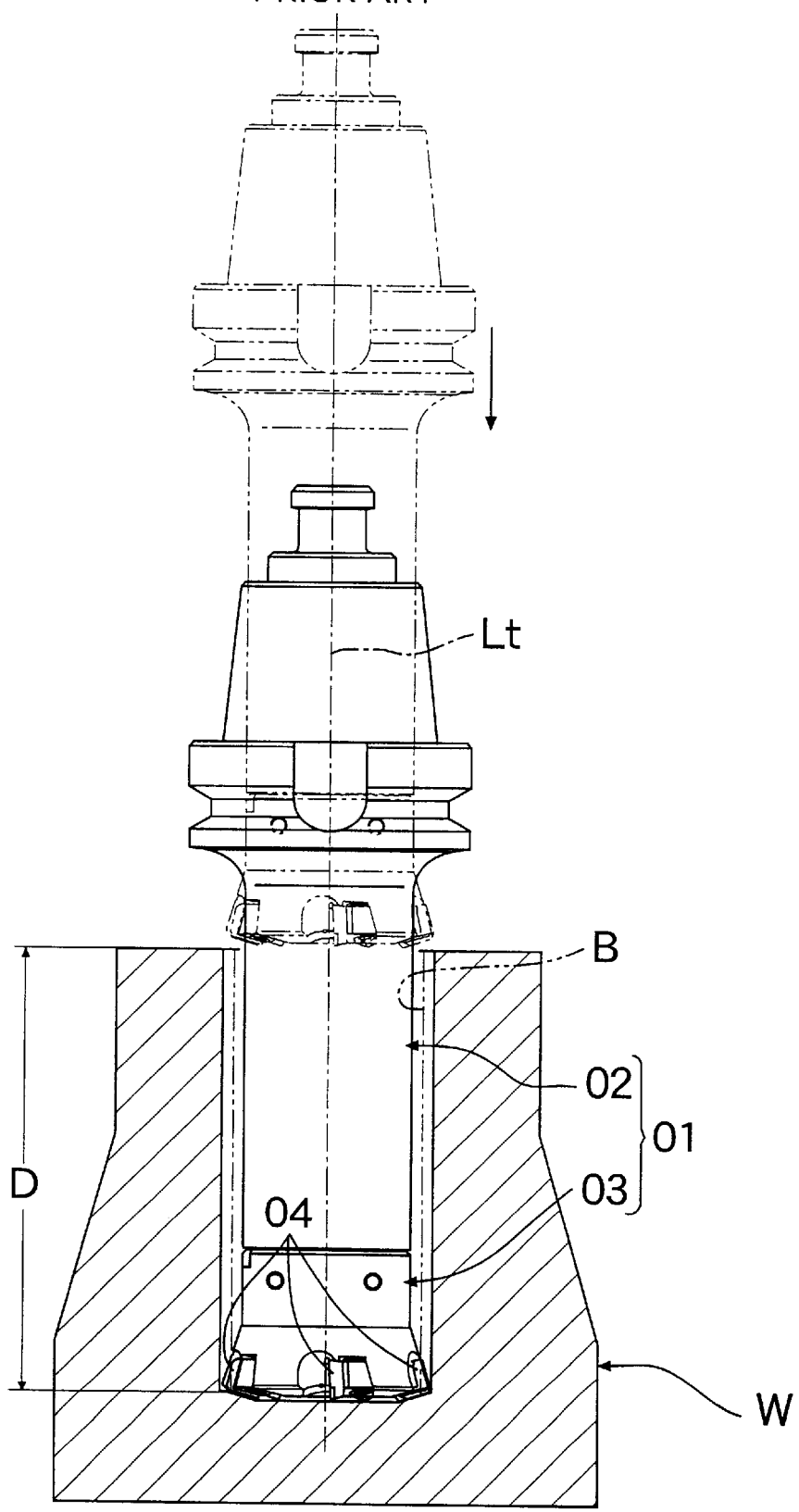
FIG. 6 is a view for explaining the structure and boring work of a prior art reamer.

Subsequently, the reamer T can be pulled fully out of the hole H by aligning the axis Lt of the reamer T with the axis Lw of the hole H in the cylinder bore B again, as shown in FIG. 5.

The inner peripheral surface of the hole H in the cylinder bore B is cut simultaneously by the three-stage chip groups 6 disposed axially at the given pitch P, as described above, and hence, the distance of axial movement of the reamer T can be decreased to a value which is one third of the distance in the prior art, thereby remarkably reducing the time of working. If the amount r of movement (eccentricity) of the axis Lt of the reamer T relative to the axis Lw of the prepared hole H' in the cylinder bore B is regulated, the diameter $d_2$ of the hole H in the cylinder bore B after the boring can be regulated and hence, the general-purpose utility of the single reamer T can be enhanced.

Although the embodiment of the present invention has been described in detail, it will be understood that the present invention is not limited to the above-described embodiment, and various modifications may be made.

For example, the reamer T has the three heads 3L, 3M and 3U in the embodiment, but the number of heads may be two or four or more. In this case, the required distance P of movement of the reamer T is a depth of the hole/the number of the heads. The number of the chips 6 provided in each of the heads 3L, 3M and 3U is not limited to five. Further, the reamer T in the present invention can also be applied for uses other than the boring in the cylinder block B in the cylinder block W.

What is claimed is:

1. A method of using a reamer for enlarging an initial diameter of a prepared hole extending along a longitudinal hole axis formed into a workpiece, the reamer including a shank, a plurality of heads and a plurality of chips, the shank extending along a longitudinal reamer axis and having a clamp portion and a head supporting portion disposed opposite the clamp portion, the plurality of heads supported and positioned in sequence relative to one another on the head supporting portion of the shank along the longitudinal reamer axis and extending radially relative to the longitudinal reamer axis to form an outer periphery with each head having a plurality of recesses formed into the outer periphery and disposed circumferentially equidistantly relative to each other, each chip being sized and adapted for detachable connection within a respective one of the recesses and having a tipped end cutting edge projecting radially outwardly from the recess and head relative to the longitudinal reamer axis to form a cutting circle diameter upon rotation of the reamer with the cutting circle diameter being smaller than the initial diameter of the prepared hole, the method comprising the steps of:
    inserting the reamer into the prepared hole with the longitudinal reamer axis oriented coexistently with the longitudinal hole axis, the reamer having at least two heads with the attendant chips;
    rotating the reamer;
    upon rotating the reamer, moving the rotating reamer such that the longitudinal reamer axis moves radially relative to the longitudinal hole axis and subsequently moving the rotating reamer such that the longitudinal reamer axis moves circumferentially about the longitudinal hole axis; and
    simultaneously with the rotating of the reamer and the moving of the longitudinal reamer axis circumferentially about the longitudinal hole axis, pulling the reamer from the workpiece thereby enlarging the initial diameter of the prepared hole.

2. A reamer for enlarging an initial diameter of a prepared hole, comprising:
    a shank extending along a longitudinal axis and having a clamp portion and a head supporting portion disposed opposite the clamp portion;
    a plurality of heads supported and positioned in sequence relative to one another on the head supporting portion of the shank along the longitudinal axis and extending radially relative to the longitudinal axis to form an outer periphery, each head having a plurality of recesses formed into the outer periphery and disposed circumferentially equidistantly relative to each other; and
    a plurality of chips, each chip being sized and adapted for detachable connection within a respective one of the recesses, each chip having a tipped end cutting edge projecting radially outwardly from the recess and head relative to the longitudinal axis to form a cutting circle diameter upon rotation of the reamer with the cutting circle diameter being smaller than the initial diameter of the prepared holes,
    wherein each head has a cylindrical portion and a conically shaped portion having a narrowed end and a widened end, the cylindrical portion being connected to the conically shaped portion at the narrowed end, wherein the recesses are formed into the conically shaped portion.

3. A reamer according to claim 2, wherein the cutting circle diameter associated with each head is identical to each other.

4. A reamer according to claim 1, wherein each head is substantially identical to each other.

5. A reamer according to claim 1, wherein each recess includes a cutting pocket portion and a clamp groove portion, the clamp groove portion sized to receive one chip.

6. A reamer according to claim 5, further comprising a clamp claw adapted for pressure contact with a respective chip, the clamp claw sized to be received within a respective recess.

7. A reamer according to claim 6, wherein each chip is disposed with a respective recess between a respective cutting pocket and the clamp claw.

8. A reamer according to claim 5, further comprising a clamp bolt and wherein the clamp claw includes a bore extending therethough in the longitudinal direction and sized to receive the clamp bolt for securing the clamp claw and the chip to the head.

* * * * *